GAIN CONTROL SYSTEM FOR FACSIMILE SCANNING
Filed Oct. 31, 1946
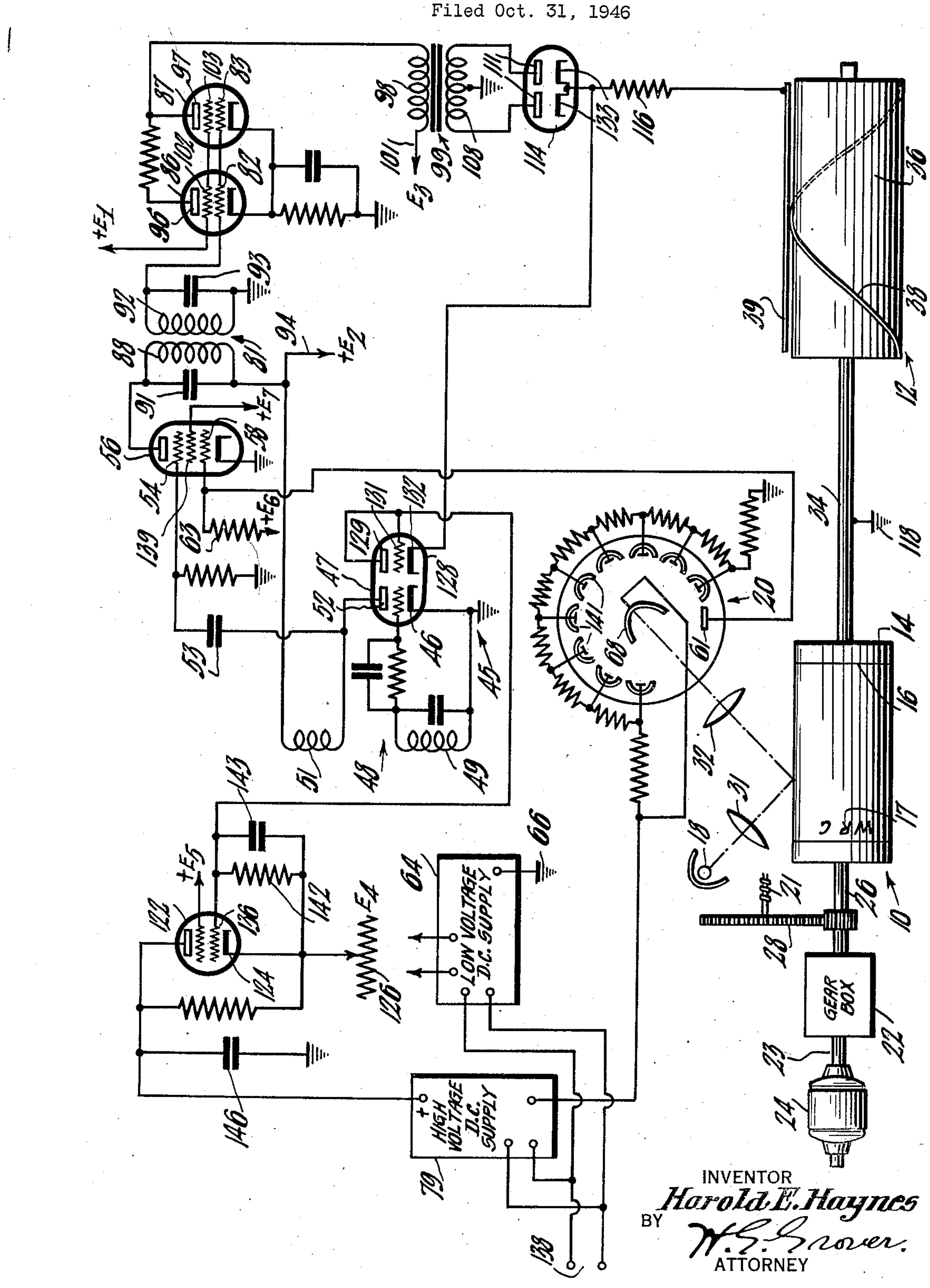
INVENTOR
Harold E. Haynes
BY W. G. Grover.
ATTORNEY Patented May 9, 1950

2,506,668

UNITED STATES PATENT OFFICE 2,506,668

GAIN CONTROL SYSTEM FOR FACSIMILE SCANNING

Harold E. Haynes, Indianapolis, Ind., assignor to Radio Corporation of America, a corporation of Delaware Application October 31, 1946, Serial No. 706,925

5 Claims. (Cl. 178—6.6)

The present invention relates to systems for producing an image of scanned subject matter such as an object or a representation in the form of a picture or map and more particularly, but not necessarily exclusively, to a novel arrangement for maintaining a consistent signal level in a facsimile scanning system.

In accordance with the invention, a recurring reference level of a varying quantity controls the sensitivity of one of the elements of the scanning system so that response to this reference level is maintained. For example, in the embodiment selected for illustrating the invention, a given amount of light, when scanning a copy area of a definite shade, should produce a definite output current in the scanning phototube and if this definite shade is sufficiently recurrent this amount of light can be caused to control the phototube sensitivity so as to produce the desired current. Where the subject matter to be scanned is printed or inscribed on a substantially white piece of record bearing material, such as paper, then "white" may be selected as the reference level. It will be understood, however, that the background may have other tints or shades, or that recurrent areas of the subject matter itself may serve for control purposes in accordance with the invention.

Accordingly, the principal object of the present invention is to provide a novel arrangement for maintaining a substantially fixed signal level in a facsimile scanning system.

Another object is to provide a novel signal level control which is maintained in operation by a recurrent condition of light intensity.

A further object is to provide a novel signal level control embodying a phototube and a power supply for the phototube together with novel means for controlling the power supply.

A still further object is to provide novel means for obtaining a control voltage in a facsimile scanning system.

Other objects and advantages of the present invention will, of course, become apparent and immediately suggest themselves to those skilled in the art to which the invention is directed from a reading of the following specification in connection with the accompanying drawing which shows schematically a facsimile system embodying the invention and including a transmitting scanner and a recording scanner.

The facsimile system shown in the single figure of the drawing is operative to scan appropriate subject matter in a transmitting scanner indicated in its entirety by reference character 10 to produce image currents which serve to operate a recording scanner 12 for the purpose of producing a recorded image of the scanned subject matter. The transmitting scanner 10 may be of any desired kind or type and is shown illustratively as comprising a drum 14 on which is secured the subject matter copy 16 which bears a picture, printed matter or other indicia 17 to be reproduced by the recording scanner or, as it will be called hereinafter, the recorder 12.

A facsimile signal generating scanning head which carries a light source 18 and a phototube 20, preferably of the electron multiplier type, is propelled axially along the drum 14 by a lead screw 21. Any suitable change-speed device 22 may, if desired, be used to connect the drive shaft 23 of a driving motor 24 with the drive shaft 26 of the scanner. A gear and pinion combination 28 drives the lead screw 21 at the proper relative speed so that closely spaced helical scanning lines are obtained as the scanning head including the light source 18 moves axially of the drum 14. It will be understood that the scanning head includes a suitable optical system for imaging a light spot from the light source upon the surface of the drum 14 and hence upon the subject copy 16 secured thereto. The optical system is shown, illustratively, as comprising two lenses 31 and 32.

The recorder 12 is mechanically driven from the transmitting scanner through a shaft 34, driving power being imparted to a drum 36 in the recorder which carries a helix 38. The helix cooperates with a printer bar 39 in a well known manner to produce marks upon a record sheet (not shown) passing between the helix and the printer bar. A recorder of this general type with a recording paper drive is shown in U. S. Patent No. Re. 20,152, granted to C. J. Young on October 27, 1936. The recorder in this last named patent relies on transfer of marking material to produce markings by vibrating the printer bar rather than on electrical or other processes which depend upon a direct application of electrical effects to the record sheet. Other details of a facsimile recorder employing an electrolytic process for producing marks are shown in U. S. Patent No. 2,391,765, granted to Maurice Artzt on December 25, 1945.

The mechanical portions of the facsimile system so far described comprise what is usually termed a "facsimile duplicator." However, it will be understood by those skilled in the art that the recorder 12 may be located at a point which is remote from the transmitter and may be driven and maintained in operation synchronously with the transmitter by any well known synchronizing system. In this instance, a simple monitoring arrangement at the transmitter may serve to operate the gain control of the invention. Moreover, both the transmitter scanner and the recorder may be of the type shown in U. S. Patent No. 2,354,571, granted on July 25, 1944, to Albert Blain, and may include the mechanical refinements shown in this patent and other patents cited therein. Other types of scanning transmitters which may be employed are shown in U. S. Patents Nos. 1,746,407 and 2,298,911, granted to F. Schroeter et al. and C. J. Young on February 11, 1930, and October 13, 1942, respectively.

In accordance with the invention an automatic gain control is disclosed which sets the over-all gain to such a value that the portions of the subject matter being copied which have the greatest or highest reflectivity will be rendered as white by the recorder. That is, the gain value necessary for any piece of copy is automatically set by its "whitest" or highest light reflecting part. The electron multiplier phototube 20 is capable of very great sensitivity and it is in itself capable of operating from D. C. to the highest frequencies which are produced upon scanning the subject copy at the transmitter at high speed. The sensitivity of a phototube of this type is of value since the light level received from the scanned copy fluctuates in value from zero to perhaps .001 lumen in value. There are several sources of gain variation in the system, chief among them being changes in electrode voltages on the multiplier, changes in multiplier sensitivity with continued use and changes in exciter lamp brightness. The automatic gain control of this invention maintains proper operating conditions in spite of gain variations introduced from the sources just named while at the same time takes full advantage of the large gain due to the electron multiplier action.

The drawing shows, by way of example, a system in which the output from the phototube 20 modulates a local oscillator signal which is generated by an oscillator designated in its entirety by reference character 45. The oscillator 45 comprises the triode section 46 of a duplex vacuum tube 47 and an oscillator transformer 48. The latter is made up of a grid coil 49 and a plate coil 51. The anode 52 of the oscillator is coupled by way of a capacitor 53 to the suppressor grid 54 of a modulator tube 56. The signal grid 58 of the modulator tube 56 is connected to the anode 61 of the phototube 20. A grid resistor 63 is connected to a source of positive potential such, for example, as one of the terminals of a D. C. supply source 64 or a suitable voltage divider therein, one end of which is grounded as indicated by reference character 66. The voltage applied at this point is designated $E_6$ in the following description. Other terminals shown on the drawing may be connected to the source 64.

The cathode 68 of the phototube 20 is connected to the negative terminal of a suitable high voltage D. C. source 79. A coupling transformer 81 serves to couple the output of the modulator tube 56 to the grids 82 and 83 of a pair of output tubes 86 and 87. The transformer 81 comprises a primary winding 88 which may, when desired, be tuned by a capacitance 91 and a secondary winding 92 which, likewise, may, when desired, be tuned by a capacitance 93. The source of anode voltage for the tube 56 is designated conventionally by reference character 94. The voltage applied at this point will be designated $E_2$ in the following description of the operation of the system.

The anodes 96 and 97 of the output tubes 86 and 87 are connected through the primary 98 of a coupling transformer 99 to a suitable source of positive voltage 101 which may be the source of low voltage supply indicated by reference character 64. The voltage applied at this point is designated $E_3$. The screen grids 102 and 103 of the output tubes are connected to an adjustable source of positive voltage as indicated diagrammatically at 106. The voltage applied at this point is designated $E_1$.

The secondary 108 of the transformer 99 is connected to the anodes 111 of a full wave demodulator tube 114. The load circuit of this demodulator tube includes a series resistor 116, the helix 38 and the printer bar 39 of the recorder 12. The helix 38 is connected to a suitable metallic part of the recorder 12 and is grounded as indicated at 118.

A tube 122 is connected in series with the high voltage D. C. supply source 79. The cathode 124 of this tube is connected to a source of positive potential such, for example, as one of the terminals of the source 64 or suitable voltage divider therein. Adjustability of the voltage designated $E_4$ applied to the cathode 124 is indicated schematically at 126.

The triode section 128 of the previously mentioned tube 47 is employed as a diode by connecting its anode 129 to its grid 131. The cathode 132 is connected to the cathodes 133 of the demodulator tube 114 which becomes the reference point for obtaining the control voltage. The resistor 116 prevents the reference point from going to ground potential in case of a bar-to-helix short circuit. The diode anode 129 of the tube section 128 is connected to the control grid 136 of the tube 122.

While tube 47 has been shown as a duplex tube with one section employed as a diode, it will be understood by those skilled in the art that a separate triode and diode may be used.

Added details of the system shown illustratively on the single figure of the drawing as well as the manner in which it functions will now be described in detail. The high voltage D. C. supply 79 and the low voltage D. C. supply 64 may be connected to a suitable power source such as A. C. mains 138.

The load resistor 63 is connected to $E_6$ for contrast control. For normal contrast $E_6$ is equal to zero. The voltage $E_7$ applied to screen grid 139 of the modulator tube 56 is set so that when no light falls on the phototube 20 and with the grid bias approximately equal to zero, the plate current component at the carrier frequency flowing in the primary 88 of the transformer 81 produces enough signal at the grids 82 and 83 of the output tubes to produce "black" in the printing circuit which is driven by the demodulator 114. Thus, $E_7$ is the black control and $E_6$ is the contrast control. When current is drawn by the phototube 20 through the resistor 63, current to the printer bar 39 goes down approximately linearly as the phototube current goes up.

Automatic gain control in accordance with the invention is accomplished by varing the total voltage supplied to the dynodes 141 of the phototube 20. The total voltage applied to the phototube 20 is adjusted in the illustrative embodiment by inserting the plate circuit of the tube 122 in series with the divider circuit across the multiplier and its power supply as an adjustable resistance.

In operation of the gain control feature a voltage is derived from the cathode 133 of the demodulator 114 as a reference point as explained above. When current is drawn by the phototube 20 through the resistor 63, the current in the resistor 116 decreases. The voltage at the reference point goes more negative and if the gain is too great, the voltage at this point goes substantially to zero. The cathode 132 then goes more negative and current is drawn from an RC combination which comprises a resistor 142 and a capacitance 143 reducing the bias on the grid 136 of the tube 122 so as to increase the resistance of this tube and decrease the gain in the system.

Slightly more in detail, the voltage at the reference point, namely the demodulator cathode 133, dips toward zero with respect to ground when white is being scanned by photocell 20. If the gain of the system is too great, this voltage will approach zero very closely but if the gain is too low, it will not dip so near to zero. These minimum excursions of the voltage at the reference point are indicative of whether gain setting is correct and are utilized by the diode section 128 of the tube 47 and the RC combination 142 and 143 to adjust gain.

The cathode 124 of the tube 122 is operated at a D. C. potential $E_4$ which is approximately equal to the potential of the reference point when the desired white condition exists in the printing circuit, plus additional voltage which is the midrange bias on the tube 122. If the gain happens to be so low that the voltage at the reference point never drops as low as $E_4$ then the potential of the grid 136 will gradually tend toward $E_4$, decreasing the resistance constituted by the plate current of the tube 122 and increasing the voltage on the multiplier of the photocell 20 which has the affect of increasing the gain in the system. Somewhere in the slow drift toward effective zero bias on the grid 136 of the tube 122, the system gain will have risen sufficiently that on white portions of the copy 16, the voltage at the reference point will dip below $E_4$ and current will be drawn by the diode section 128 of the tube 47 from the RC combination 142 and 143 tending to reduce gain. An equilibrium will be reached with white portions of the copy in the recorder 12 being given the desired white value. Changing $E_4$ will adjust the minimum excursions of output current and is thus a "white" control.

A capacitor 146 is connected from ground to the positive side of the high voltage supply. Oscillation is prevented by having increased timing of the RC combination 142—143 to decrease the grid circuit resistance of the tube 122.

Solely, by way of example, the following types of tubes may be employed in the illustrative system shown by the drawing. The phototube is a nine-stage electrostatically focussed type, the type 931–A being suitable. In the type of phototube mentioned by way of example, the voltage across the terminal of the source 79 is to be approximately 1300 volts. The output tubes 86 and 87 may be type 807 tubes. The demodulator tube 114 may be a type 5V4G. The tube 122 which is in series with a high voltage power supply may be a type 807. The modulator tube may be a type 6AC7. The combined tube 47 may be a type 6SN7GT. With the tube complement indicated by way of example, the voltage $E_1$ may be 300 volts, the voltage $E_2$ may be 250 volts, and the voltage $E_3$ may be 600 volts. With the suggested tube complement, the resistor 142 may have a value of 220,000 ohms, and the capacitance 143 may have a value of 1 mf. The frequency of the carrier generated by the modulator 56 may, for example, be 400 kilocycles. The side-bands arising from the modulation process may for example, be plus or minus 15 kilocycles but the bandwidth will vary with the speed of scanning and other factors.

Having now described the invention, what is claimed and desired to be secured by Letters Patent is the following:

1. Facsimile apparatus for deriving facsimile signals varying in accordance with the light and shade values of subject copy comprising means for delivering light varying in accordance with the light and shade values of subject copy to an electron multiplier phototube in which an electrical current varies in accordance with the intensity of received light, means for generating a carrier wave, means for modulating said carrier wave in accordance with the current in said phototube, and means for automatically setting the gain of the electron multiplier of said phototube in accordance with a single light value.

2. Facsimile apparatus for deriving facsimile signals varying in accordance with the light and shade values of subject copy comprising means for delivering light varying in accordance with the light and shade values of subject copy to an electron multiplier phototube in which an electrical current varies in accordance with the intensity of received light, means for generating a carrier wave, means for modulating said carrier wave in accordance with the current in said phototube, means for amplifying the modulated wave, means for demodulating the amplified wave, means for deriving a control voltage from the demodulating means, and means for automatically setting the gain of said phototube in accordance with the control voltage.

3. Facsimile apparatus for deriving facsimile signals varying in accordance with the light and shade values of subject copy comprising, means for delivering light varying in accordance with the light and shade values of subject copy to a sensitively responsive device in which electrical current varies in accordance with the intensity of light received by said device, means for generating a carrier wave, means for modulating the carrier wave in accordance with the current in said device, means for demodulating said carrier wave, recording means actuated by said demodulated carrier wave, and means connected to said recording means for setting the overall gain of said facsimile apparatus.

4. Facsimile apparatus for deriving facsimile signals varying in accordance with the light and shade values of subject copy comprising, means for delivering light varying in accordance with the light and shade values of subject copy to a sensitively responsive device in which an electrical current varies in accordance with the intensity of light received by said device, recording means, means to provide signalling current to said recorder varying in accordance with the amplified output of said device, a resistor in the input circuit to said recorder to prevent total short-circuiting by the recorder of the output of said signal current providing means for said recorder, and means for automatically setting the overall gain of said facsimile apparatus, said last named means being responsive to a voltage representative of a predetermined light value.

5. A facsimile signalling system comprising a scanner having means including an electron multiplier phototube for generating signals representing the scanning of subject matter, an output circuit for said phototube including a resistor, means for generating a carrier frequency, a modulator tube comprising a cathode, an anode and a control electrode, said control electrode being coupled to said phototube output circuit, means coupling the output of said carrier frequency generating means to said modulator tube, a demodulator, diode rectifying elements coupled to the output circuit of said demodulator, a time constant circuit comprising a resistor and a capacitor in parallel combination, a connection from the anode of said diode to one terminal of said capacitor and resistor combination, a control tube comprising a cathode, an anode and a control grid, a connection from said control grid to the anode of said rectifier section, a connection from the other terminal of said capacitor and resistor combination to the cathode of said control tube, a high voltage supply source for the electron multiplier section of said phototube, the cathode-anode circuit of said control tube being included in series between said electron multiplier section and said power supply source, means to apply a biasing voltage to the cathode of said control tube, said biasing voltage being approximately equal to the voltage developed in the output circuit of said demodulator whereby when maximum light falls on said phototube from the subject copy, current will be drawn by said rectifier to increase the impedance of said control tube thereby to reduce gain.

HAROLD E. HAYNES.

REFERENCES CITED

The following references are of record in the file of this patent:

UNITED STATES PATENTS

| Number | Name | Date |
|---|---|---|
| 1,820,335 | Von Bronk | Aug. 25, 1931 |
| 2,063,694 | Moller | Dec. 8, 1936 |
| 2,315,362 | Wise | Mar. 30, 1943 |
| 2,346,557 | Conklin | Apr. 11, 1944 |
| 2,397,559 | O'Brien | Apr. 2, 1946 |